United States Patent [19]

Zuber

[11] 4,430,119

[45] Feb. 7, 1984

[54] SELECTIVE REMOVAL OF MAGNESIUM IN THE CONSUMPTION OF ALUMINUM USED BEVERAGE CONTAINER SCRAP

[75] Inventor: Chester L. Zuber, Evansville, Ind.

[73] Assignee: Aluminum Company of America, Pittsburgh, Pa.

[21] Appl. No.: 454,269

[22] Filed: Dec. 29, 1982

[51] Int. Cl.³ .............................................. C22B 21/06
[52] U.S. Cl. ...................................... 75/63; 75/68 R
[58] Field of Search ................... 75/68 R, 63; 134/19

[56] References Cited

U.S. PATENT DOCUMENTS

| 2,174,926 | 10/1939 | Messner | 75/68 R |
| 4,016,003 | 4/1977 | Stauffer | 134/19 |
| 4,097,270 | 6/1978 | Rao et al. | 75/63 |
| 4,235,646 | 11/1980 | Neufeld et al. | 148/2 |
| 4,269,632 | 5/1981 | Robertson et al. | 148/2 |

Primary Examiner—M. J. Andrews
Attorney, Agent, or Firm—Andrew Alexander

[57] ABSTRACT

The magnesium content in used aluminum scrap is reduced by preheating the scrap to a temperature sufficiently high to promote migration of the magnesium to the surface of the scrap. Thereafter, the magnesium is removed by oxidation.

12 Claims, 2 Drawing Figures

SELECTIVE REMOVAL OF MAGNESIUM IN THE CONSUMPTION OF ALUMINUM USED BEVERAGE CONTAINER SCRAP

BACKGROUND OF THE INVENTION

This invention relates to processing of aluminum scrap, e.g. used containers, fabricated, at least in part, from aluminum base alloys containing magnesium. More particularly, this invention relates to a method or process for reducing the magnesium content of such aluminum scrap.

In the packaging or container field, there has been ever-increasing interest and extensive research into methods of reclaiming the aluminum components from scrap materials, such as the aluminum in used beverage containers having at least one or more components thereof fabricated from aluminum alloys. The interest has been precipitated by the importance of conserving resources and caring for environmental problems. However, heretofore recycling such materials has been somewhat hampered by the presence of varying amounts of alloying ingredients in the various alloys contained in the scrap. For example, attempts to recycle a beverage can having a body fabricated from one aluminum base alloy and a top or lid constructed from a different aluminum base alloy often results in an aluminum melt having a composition of neither alloy. Such melt greatly decreases in value because it does not readily lend itself to reuse in the fabrication of new bodies or lids without major dilutions, purifications and realloying, or other modifications.

A notable example of this problem is the varying amount of magnesium which is used respectively in a beverage can body and in the lid or cover for the beverage can. Conventional alloys for can ends, e.g., Aluminum Association (AA alloy) 5182, 5082, 5042, 5352 or 5052, can have up to 4.5 times the amount of magnesium found in the alloys usually used in the can body, e.g., AA3004, AA3104 or AA3003. Thus, when the composite can end and body are subsequently recycled, the overall magnesium content is much lower than that found in the alloys used for can ends but is significantly higher than the amount found in the alloys used for the body of the can. While such scrap metal could be reused in the production of alloys suitable for use in the fabrication of can bodies, it is necessary to carry out costly magnesium reduction procedures and/or dilution of the recovered scrap metal with pure aluminum, that is, aluminum containing only nominal amounts of magnesium.

U.S. Pat. No. 4,269,532 indicates that since the conventional alloys for can ends, e.g. AA5182, AA5082 or AA5052, and for can bodies, e.g. AA3004 or AA3003, differ significantly in composition and in the manufactured can, the end and body are essentially inseparable, and an economical recycle system requires the use of the entire can. U.S. Pat. No. 4,269,632 further notes that the recycling of cans results in a melt composition which differs significantly from the compositions of both the conventional can end and can body alloys. In this patent, it is suggested that both can end and body be fabricated from the same alloy to obviate the recycling problem. With respect to can ends and bodies made from AA5182 and AA3004, it is indicated that some amount of normally pure aluminum must be added even to prepare the special alloy disclosed therein to reduce either the magnesium or manganese levels. The patentees recite the use of conventional shredding and delaquering steps prior to remelt and indicate that the temperature to pyrolyze the organic coatings should not be sufficient to oxidize the metal scrap. It is further indicated by the patentees that, although some amount of magnesium (up to 0.3% may be lost by oxidation in the remelting process, excess amounts of magnesium may be reduced by fluxing the melt with chlorine gas to form an insoluble magnesium chloride but that dilution with pure aluminum is preferred.

It would, of course, be preferred to recover conventional aluminum scrap metal from the melting of containers, such as used beverage containers, regardless of the presence of mixtures of different alloys, which could be recycled back into the manufacture of any alloy which may be subsequently used in the manufacture of either the container body or the lid or cover for the container.

SUMMARY OF THE INVENTION

It is, therefore, an object of the invention to provide an improved method for the recovery of aluminum from used container scrap.

It is another object of the invention to provide an improved method for the recovery of aluminum from used container scrap comprising more than one aluminum alloy.

It is yet another object of the invention to provide a method for lowering the magnesium content of aluminum metal recovered from used container scrap comprising aluminum base alloys containing magnesium.

It is a further object of the invention to provide for lowering the magnesium content of aluminum scrap comprising a mixture of beverage container ends and beverage container bodies.

These and other objects of the invention will be apparent from the drawings and accompanying description.

In accordance with the invention, a process is disclosed for recovery of aluminum from aluminum-containing scrap wherein at least a portion of the aluminum scrap comprises one or more alloys of aluminum containing greater than 1.4 wt.% magnesium. The process comprises heating the aluminum scrap to a temperature of at least 450° C. and maintaining the aluminum scrap at this temperature or above for a period of time long enough to oxidize sufficient magnesium therefrom for purposes of lowering the overall level of magnesium in an aluminum melt of the scrap.

DESCRIPTION OF THE INVENTION

The process of the invention is particularly suited for the recovery of aluminum from used beverage containers comprised of two different aluminum alloys. However, the method can be applied to the recovery of any scrap material wherein the content of the magnesium in the scrap is desired to be lowered.

Scrap materials from which aluminum is to be recovered is usually subjected to preliminary sorting to remove materials which would contaminate the aluminum alloy to be recovered. For example, it is desirable to remove glass bottles and steel cans, such as used for food, for example, if these are packaged or baled with the aluminum scrap. Furthermore, it is desirable to remove other materials, such as dirt and sand, etc., in order to cut down on the amount of silicon, for example, that can occur in the reclaimed alloy. Elimination of these materials can permit use of the alloy reclaimed in accordance with the present invention without further purification procedures. The removal of steel, as may be present in the form of container bodies or other sources, aids in keeping the iron within the specifications set forth for the reclaimed aluminum alloy.

When the materials to be reclaimed are food or beverage containers, these are normally packaged in bales for shipping purposes; and, therefore, prior to the sorting step, the bodies should be broken apart to facilitate separation and removal of foreign materials.

After the sorting step, the containers are usually subjected to a delacquering step. This is conventionally accomplished either by solvent or thermal treatment. The delacquering removes the coatings, such as decorative and/or protective coatings, which when present, dramatically increases melt loss and elements resulting therefrom are not normally desirable in the aluminum alloys being reclaimed. When solvent delacquering is used, it is usually desirable to shred or pierce the containers in order to facilitate removal of the solvent therefrom. When the coatings are removed by thermal treatments, the temperature used is normally in the range of about 315° to 538° C. (600° to 1000° F.).

In accordance with the invention, the step of lowering the magnesium content of the aluminum base alloys in the scrap preferably follows the delacquering step. When the delacquering is accomplished via the solvent method, the delacquered scrap is heated to a temperature sufficient to oxidize magnesium from the aluminum base alloys comprising the scrap. If delacquering is accomplished by heating, the temperature is either raised or the time period extended, as the case may be, to carry out the magnesium removal step.

Figure 1:
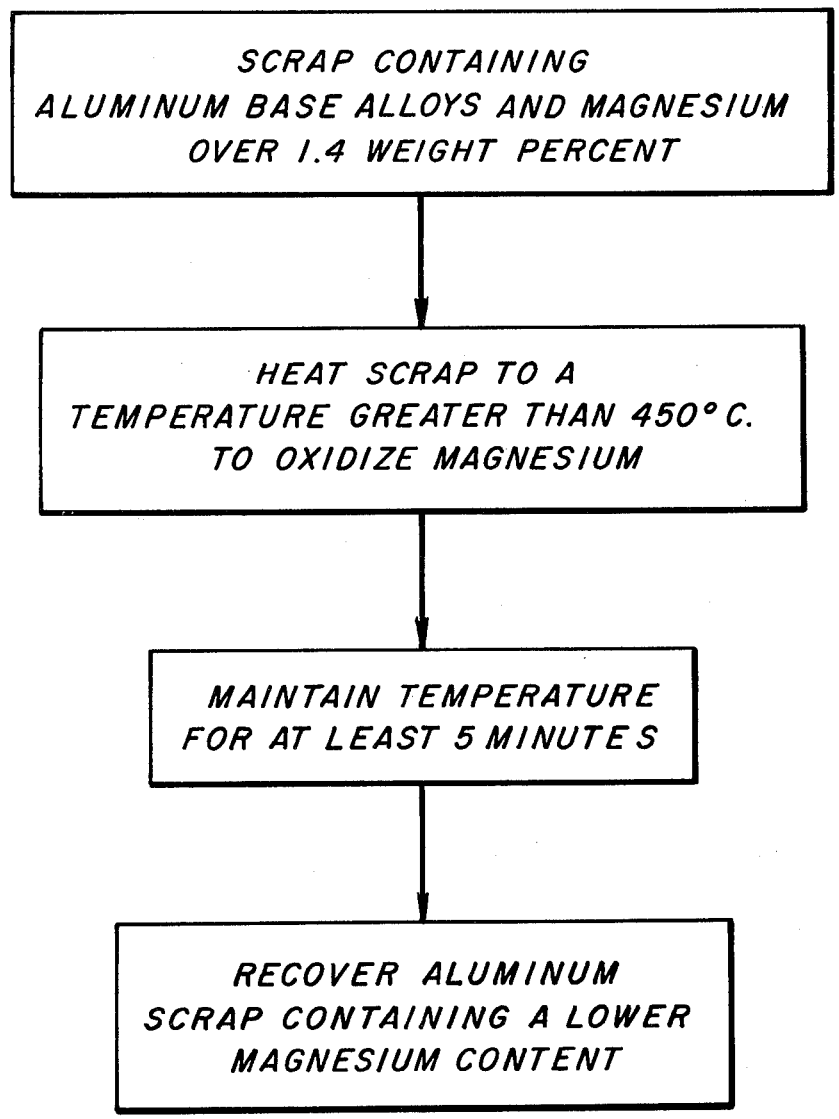
FIG. 1 is a flow sheet illustrating the process of the invention.
Figure 2:
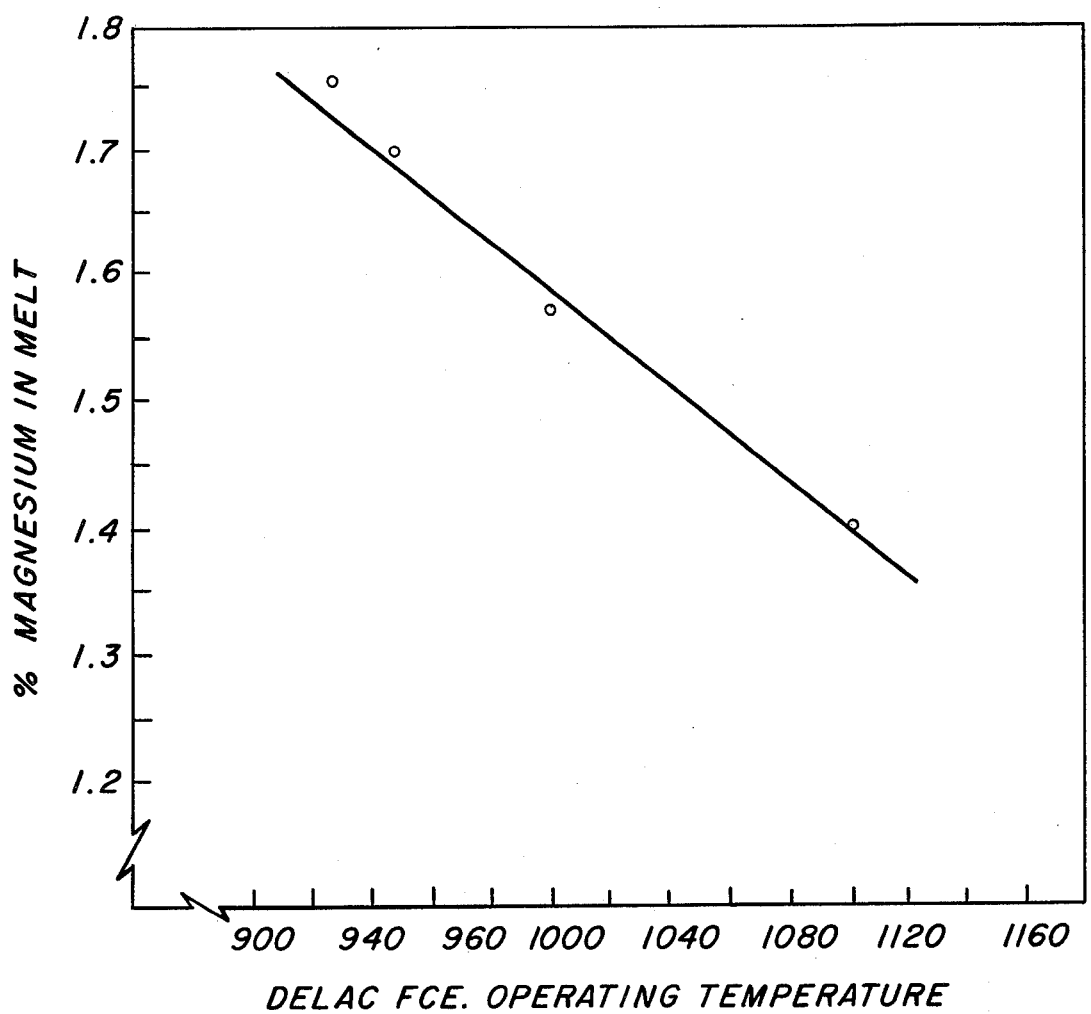
FIG. 2 is a graph showing the relationship between magnesium reduction and the preheating temperature.

The temperature to which the scrap is heated to effect significant removal of magnesium is at least 900° F. Preferably, the scrap is heated from a temperature in the range of 900° F. up to the melting point of the alloy with highly suitable temperatures being in the range of 1070° to 1180° F. for removal of magnesium from 5XXX series aluminum alloys such as AA5182. The relationship of the temperature to the amount of magnesium removal is illustrated in the graph of FIG. 2. During the magnesium removal step, oxygen containing gas, e.g., air, may be passed through the heated scrap to accelerate the magnesium oxidation.

In accordance with one embodiment of the process of the invention, particularly where the aluminum scrap comprises or contains used beverage containers having bodies formed from Aluminum Association Alloy (AA) 3004 or AA3104 and having lids formed from AA5182, for example, the scrap containers can be heated to a temperature in the range of 1077° to 1178° F. It will be understood that AA5182 starts to melt at 1077° F. and is molten at about 1178° F. Further, it will be understood that magnesium removal is greatly facilitated when the alloy is in the molten state.

The residence time for the scrap in the magnesium removal step will vary in time commensurate with the temperature. That is, the hotter the temperature, the shorter the residence time. This time-temperature relationship is maintained not only with respect to the oxidation reaction which will be expedited by the higher temperatures, but also with respect to the melting points of the aluminum base alloys comprising the scrap.

To illustrate the practice of the invention, production runs were made using used beverage container scrap containing an average of about 1.9 to 2.00 wt.% magnesium. In three instances, the scrap was initially heated to a lower temperature and held at that temperature to delacquer the scrap, and then the temperature was raised higher for the magnesium reduction step. In the one instance where mechanical agitation was also included, the delacquering and magnesium reduction were carried out in a single step. Run #5 was also conducted as a single step. The results listed in Table I show a significant reduction in magnesium content in the subsequent melt, particularly when the high end of the temperature range is coupled with rotation.

TABLE I

| Run | First Stage | | Second Stage | | % Mg in Melt |
|---|---|---|---|---|---|
| | Temp. (°F.) | Time (min.) | 2Temp. (°F.) | Time (min.) | |
| #1* | 1100 | 8 | — | — | 1.40** |
| #2 | 750 | 5 | 1000 | 10 | 1.55–1.60** |
| #3 | 750 | 5 | 1000 | 10 | 1.55 |
| #4 | 750 | 5 | 950 | 10 | 1.70 |
| #5 | 750 | 5 | 930 | 10 | 1.75 |

*Rotary Kiln used.
**Aluminum chloride salt for removing magnesium was also added to the melt.

Having thus described the invention, what is claimed is:

1. A process for recovery of aluminum from aluminum-containing scrap wherein at least a portion of the aluminum scrap comprises one or more alloys of aluminum containing greater than 1.4 wt.% magnesium comprising:
   (a) heating the aluminum scrap to a temperature of at least 850° F.; and
   (b) maintaining the aluminum scrap at this temperature for a period of time long enough to oxidize sufficient magnesium therefrom for purposes of lowering the overall level of magnesium in an aluminum melt of the scrap.

2. The process of claim 1 wherein said aluminum scrap comprises at least one aluminum base alloy having a magnesium content of at least 1.6 wt.%.

3. The process of claim 1 wherein said aluminum scrap comprises a mixture of aluminum base alloy including at least one aluminum base alloy having a magnesium content not exceeding 1.4 wt.% and at least one aluminum base alloy having a magnesium content of at least 1.6 wt.%.

4. The process of claim 1 wherein the temperature is maintained at from 880° F. to the melting point of one of said alloys.

5. The process of claim 1 wherein the temperature is maintained at from 930° to about 1178° F.

6. The process of claim 1 wherein the temperature of the aluminum scrap is maintained over 1000° F., but not over 1178° F., for at least 10 minutes.

7. The process of claim 1 wherein at least 20 wt.% of the aluminum scrap comprises one or more aluminum base alloys having a magnesium content of at least 1.6 wt.%.

8. The process of claim 1 wherein said aluminum scrap comprises used beverage cans having ends made from an aluminum base alloy having a magnesium content greater than 1.6 wt.%.

9. The process of claim 9 wherein the balance of said aluminum scrap comprises can bodies having a magnesium content not greater than 1.4 wt.%.

10. The process of claim 1 wherein said scrap is heated to a temperature of at least 1000° F. and maintained at this temperature for at least 10 minutes to reduce the magnesium level in said scrap to not more than 1.55 wt.%.

11. The process of claim 10 wherein said scrap is first preheated to a temperature of at least 750° F. for a period of at least 5 minutes and subsequently heated to a temperature of at least 1000° F. for at least 10 minutes.

12. A process for the reduction of the magnesium content in aluminum beverage container scrap comprising beverage container ends having a magnesium content greater than 1.6 wt.% and beverage container bodies having a magnesium content not greater than 1.4 wt.% which comprises:
   (a) heating the aluminum scrap mixture to a temperature of from 900° F. to 1178° F. to oxidize magnesium in said scrap; and
   (b) mechanically agitating the scrap to facilitate oxidation of said magnesium.

* * * * *